US012740501B2

(12) United States Patent
Xu et al.

(10) Patent No.: US 12,740,501 B2
(45) Date of Patent: Sep. 22, 2026

(54) METHOD FOR CULTIVATING ALCOHOL-BREWING SORGHUM ON BASIS OF BIODEGRADABLE MULCHING FILM, AND USE THEREOF

(71) Applicant: JIANGSU ACADEMY OF AGRICULTURAL SCIENCES, Nanjing (CN)

(72) Inventors: Lei Xu, Nanjing (CN); Min Wang, Nanjing (CN); Gang Chen, Nanjing (CN); Nina Yan, Nanjing (CN); Xizhi Jiang, Nanjing (CN); Jingwen Chen, Nanjing (CN); Jie Pi, Nanjing (CN); Jun Liu, Nanjing (CN); Hongde Xie, Nanjing (CN); Min Feng, Nanjing (CN)

(73) Assignee: JIANGSU ACADEMY OF AGRICULTURAL SCIENCES, Nanjing (CN)

( * ) Notice: Subject to any disclaimer, the term of this patent is extended or adjusted under 35 U.S.C. 154(b) by 262 days.

(21) Appl. No.: 18/721,894

(22) PCT Filed: Sep. 30, 2022

(86) PCT No.: PCT/CN2022/122966
§ 371 (c)(1),
(2) Date: Jun. 20, 2024

(87) PCT Pub. No.: WO2023/116115
PCT Pub. Date: Jun. 29, 2023

(65) Prior Publication Data

US 2025/0072342 A1 Mar. 6, 2025

(30) Foreign Application Priority Data

Dec. 23, 2021 (CN) ........................ 202111591937.7

(51) Int. Cl.
*A01G 13/33* (2025.01)
*A01B 79/02* (2006.01)
(Continued)

(52) U.S. Cl.
CPC .............. *A01B 79/02* (2013.01); *A01G 13/33* (2025.01); *A01G 22/20* (2018.02); *A01G 13/39* (2025.01)

(58) Field of Classification Search
CPC ........ A01B 79/02; A01C 5/066; A01G 13/33; A01G 13/37; A01G 13/30; A01G 13/39
See application file for complete search history.

(56) References Cited

U.S. PATENT DOCUMENTS 1,787,902 A * 1/1931 Herfort .................. A01G 13/37 405/176
3,180,290 A * 4/1965 Kappelmann .......... A01C 5/066 47/9
(Continued)

FOREIGN PATENT DOCUMENTS

CN 110115123 A * 8/2019 ............. A01B 49/06
CN 110249934 A * 9/2019 ............. A01G 22/20
CN 115053770 A * 9/2022 ........... A01C 21/005

*Primary Examiner* — Jamie L McGowan
(74) *Attorney, Agent, or Firm* — CBM PATENT CONSULTING, LLC

(57) ABSTRACT

A method for cultivating alcohol-brewing sorghum on the basis of a biodegradable mulching film includes five steps such as farmland preparation, film mulching, sowing operation, field management and harvesting. Compared with a traditional alcohol-brewing sorghum planting method, the method of the present invention can effectively bring forward the planting time of alcohol-brewing sorghum, reduce the sowing amount of alcohol-brewing sorghum, assist in increasing the germination rate of alcohol-brewing sorghum, and promote the growth and development of alcohol-brewing sorghum; moreover, the method of the present invention (Continued)

effectively reduces the labor intensity and cost of a weeding operation in field management.

7 Claims, 3 Drawing Sheets

(51) Int. Cl.
*A01G 22/20* (2018.01)
*A01G 13/39* (2025.01)

(56) References Cited

U.S. PATENT DOCUMENTS 3,234,691 A * 2/1966 Cowell .................. A01G 13/37 47/9
3,293,797 A * 12/1966 Kappelmann .......... A01G 13/37 47/9
3,559,599 A * 2/1971 Hoadley ................ A01G 13/37 47/29.1
4,513,530 A * 4/1985 Nyboer .................. A01G 13/37 47/9
4,953,482 A * 9/1990 Emily .................... A01G 13/37 47/9
6,094,858 A * 8/2000 Shine ..................... A01G 13/37 47/1.01 R
7,188,447 B2 * 3/2007 Rose ...................... A01G 13/37 47/32.2
11,432,478 B2 * 9/2022 Freeman ................ A01G 13/37
2010/0239372 A1 * 9/2010 Garcia De Alba Flores ............... A01G 13/33 405/43
2015/0156963 A1 * 6/2015 Choe ...................... A01B 49/06 111/199
2019/0364747 A1 * 12/2019 Freeman ................ A01G 13/37

* cited by examiner

METHOD FOR CULTIVATING ALCOHOL-BREWING SORGHUM ON BASIS OF BIODEGRADABLE MULCHING FILM, AND USE THEREOF

TECHNICAL FIELD

The present invention belongs to the technical field of agricultural planting, and particularly relates to a method for cultivating alcohol-brewing sorghum on the basis of a biodegradable mulching film, and a use thereof.

BACKGROUND

As an important grain crop across China, alcohol-brewing sorghum is widely used in the brewing industry and other fields. Currently, the alcohol-brewing sorghum are highly susceptible to the number of effective accumulated temperature days, natural rainfall irrigation, and other factors, since the traditional planting methods are widely used, the alcohol-brewing sorghum will be in a dormant state, which seriously affects yield and economic benefits of alcohol-brewing sorghum, especially when no sufficient water is available. In additional, the traditional planting methods make the cultivation of alcohol-brewing sorghum highly susceptible to climate and environment, resulting in poor stability of the development and growth cycles, increasing demand for water and fertilizer management in the field management, and significantly increasing the labor intensity and costs associated with water and fertilizer management in the cultivation of alcohol-brewing sorghum. Moreover, the traditional planting methods are easy to cause soil compaction and fertility decline due to a large amount of chemical fertilizer, further reducing the yield and economic benefits of alcohol-brewing sorghum. Furthermore, since the cultivation of alcohol-brewing sorghum requires a large amount of water and fertilizer, which results in vigorous growth of weeds in the fields. Therefore, it is necessary to frequent weeding in the cultivation process, resulting in strong labor intensity in the field management, and weeds can easily affect the production and development of alcohol-brewing sorghum, and cause water and fertilizer loss in farmland, further affecting the yield and economic benefits of alcohol-brewing sorghum.

Although some current techniques adopt film mulching for the cultivation of alcohol-brewing sorghum, mulching film is prone to plastic pollution and further damage a soil structure of the farmland, thereby affecting the yield of alcohol-brewing sorghum.

Therefore, in order to address this issue, it is necessary to develop a new alcohol-brewing sorghum cultivation technology on the basis of the biodegradable mulching film, so as to overcome the shortcomings of the current cultivation practices and meet the demand for improving the yield and quality of alcohol-brewing sorghum.

SUMMARY

In order to overcome the defects in the prior art, the present invention provides a method for cultivating alcohol-brewing sorghum on the basis of a biodegradable mulching film and a use thereof, the method of the present invention can effectively bring forward the planting time of alcohol-brewing sorghum, reduce the sowing amount of alcohol-brewing sorghum, assist in increasing the germination rate of alcohol-brewing sorghum, and promote the growth and development of alcohol-brewing sorghum, so as to effectively reduce the root interference and nutrient loss caused by weeds to the growth and development of alcohol-brewing sorghum, further improve the yield of alcohol-brewing sorghum.

A method for cultivating alcohol-brewing sorghum on the basis of a biodegradable mulching film and a use thereof, including the following steps:

S1. farmland preparation: firstly, farmland is deeply plowed through a rotary cultivator, the farmland after deep plowing is dried for 5-15 d and is raked, base fertilizer and bactericide are then applied to the farmland as a whole in the raking process, ridging operation is finally performed in the farmland, ridge surfaces, ridge ditches and side surfaces in the farmland after raking and ridging are sprayed with herbicide, and the farmland after being sprayed with the herbicide is dried for 1-3 d; where the herbicide is S-metolachlor (96% EC) with 100-125 ml per 666.67 square meters, and then diluted with 40 kg of water for spraying; or the herbicide is 38% atrazine water suspension with 180-240 ml per 666.67 square meters, and then diluted with 40 kg of water for spraying;

S2. film mulching: the ridge surfaces and side surfaces after being prepared in the step S1 are covered with the biodegradable mulching film through a film mulching machine, the biodegradable mulching film is covered on the ridge surfaces and side surfaces, and surfaces of the biodegradable mulching film after mulching are flattened to achieve positioning of the biodegradable mulching film;

S3. sowing operation: 5 d after the positioning operation of the biodegradable mulching film in the step S2, punching is performed on the ridge surfaces by using a punch planter for sowing alcohol-brewing sorghum, where the sowing operation is performed from mid-April to late June, water holding capacity is 60-70% during sowing, a punching depth for sowing is 2.5-5 cm, 2-5 seeds are sown in each hole, and a total sowing amount is 0.5-0.8 kg per 666.67 square meters;

S4. field management: after the sowing operation is completed, topdressing and routine field management are performed on the sowed alcohol-brewing sorghum, resowing and removal of the alcohol-brewing sorghum seedlings are performed when the alcohol-brewing sorghum seedlings reach 15-30 cm on average, and after the resowing and removal of the alcohol-brewing sorghum seedlings are completed, the number of seedlings reaches 10,000-15,000 seedlings per 666.67 square meters; at the same time, topdressing is performed according to a standard of 3-5 kg per 666.67 square meters within 3-7 d upon completion of the resowing and removal of the alcohol-brewing sorghum seedlings, another topdressing is performed according to a standard of 10-20 kg per 666.67 square meters at a jointing stage and a heading stage, respectively; and further, pest prevention, weeding operation, irrigation and waterlogging prevention management are synchronously performed according to the development and growth of alcohol-brewing sorghum; and S5. harvesting: harvesting operation of the alcohol-brewing sorghum is performed before late October, residual alcohol-brewing sorghum straw and residual biodegradable mulching film are synchronously crushed, and the crushed straw and biodegradable mulching film can be used for preparing the farmland in the step S1, and evenly distributed in the farmland through a deep plowing operation, and covered and stirred by the deep plowing soil, such that the farmland preparation is completed for subsequent sowing.

Further, in the step S1, the deep plowing operation is performed after the harvest of the alcohol-brewing sorghum is completed, and after the deep plowing and drying are completed:

when it is necessary to resow autumn and winter crops, subsequent crop planting needs to be performed after 5-15 d of drying, and the farmland needs to be subjected to a deep plowing operation again after the autumn and winter crops are harvested to prepare for the planting of alcohol-brewing sorghum in a second year; and when the harvest of the alcohol-brewing sorghum is completed and the farmland is left fallow, drying can be performed after the deep plowing operation is completed until the base fertilizer and the raking operation are performed before the alcohol-brewing sorghum is planted.

Further, the base fertilizer topdressed in the step S1 is any one of or both of biological compound fertilizer and compost, and soil bactericide and insecticide spraying operation are simultaneously performed during the topdressing of the base fertilizer.

Further, in the step S2, a width of the biodegradable mulching film is 1.3-2 times a width of the ridge surface, and edges of the biodegradable mulching film are embedded under a top layer of the soil, with a depth of not less than 10 mm.

Further, during the sowing operation, a diameter of the punching hole is 10-30 mm, a punching axis forms an included angle of 45°-90° with the ridge surface, and a punching depth for sowing is 10%-20% of a height of the ridge.

Further, in the step S2, the film mulching machine includes a carrier body, spray rollers, a main pressure roller, auxiliary pressure rollers, an adjustable roller frame, soil covering wheels, a film unwinding frame, a spray pump, an agricultural chemicals tank and a drive circuit, where the film unwinding frame is connected to an upper end surface of the carrier body, the adjustable roller frame is connected to a lower end surface of the carrier body, and further, axes of the adjustable roller frame and the film unwinding frame are parallel to each other and are perpendicular to an axis of the carrier body; a guide groove is formed on the corresponding carrier body between the adjustable roller frame and the film unwinding frame, at least one spray roller is embedded inside the guide groove and is perpendicular to the axis of the carrier body, two ends of the spray roller are connected to a side wall of the guide groove through shaft sleeves and are communicated with the spray pump through guide pipes, and the spray pump is further communicated with the agricultural chemicals tank, the main pressure roller and the auxiliary pressure rollers are both connected to the adjustable roller frame, an axis of the main pressure roller is parallel to the lower end of the carrier body and is perpendicular to the axis of the carrier body, two auxiliary pressure rollers are provided, the two auxiliary pressure rollers are symmetrically distributed on two sides of the main pressure roller, the axis of the main pressure roller and the auxiliary rollers form an included angle of 0°-90°, six soil covering wheels are provided and are symmetrically distributed on two sides of the adjustable roller frame, and are located on outer sides of the auxiliary rollers, axes of the soil covering wheels are parallel to the axis of the main pressure roller, lower end surfaces of the soil covering wheels exceed lower end surfaces of the auxiliary rollers by at least 5 mm, and the drive circuit is connected to the upper end surface of the carrier body and is electrically connected to the adjustable roller frame, the film unwinding frame, and the spray pump, respectively.

Further, the adjustable roller frame includes a lifting drive mechanism, a load-bearing beam, guide side beams, telescopic adjustment columns, an elastic hinge and a turntable mechanism, where the load-bearing beam and the guide side beams are groove frame structures with each being provided with an axial cross section as an upside-down box, the main pressure roller is embedded inside the load-bearing beam and is parallel to an axis of the load-bearing beam, the auxiliary pressure rollers are embedded inside the guide side beams and are parallel to axes of the guide side beams, diameters of the main pressure roller and the auxiliary pressure rollers are at least twice widths of the load-bearing beam and the guide side beams, an upper end surface of the load-bearing beam is hinged to the lifting drive mechanism through the elastic hinge, an intersection of the load-bearing beam and the lifting drive mechanism is located at a midpoint of the load-bearing beam, an upper end surface of the lifting drive mechanism is hinged to the lower end surface of the carrier body through the turntable mechanism, an axis of the lifting drive mechanism and the lower end surface of carrier body form an included angle of 0°-90°, a left side and a right side of the load-bearing beam are respectively connected to an upper end surface of one of the guide side beams through the telescopic adjustment columns, two ends of the telescopic adjustment columns are hinged to the load-bearing beam and the guide side beams respectively through the turntable mechanism, axes of the load-bearing beam and the guide side beams form included angles of 0°-90°, an outer side surface corresponding to a lower end surface of the lifting drive mechanism is connected to one soil covering wheel, and the lifting drive mechanism and the turntable mechanism are both electrically connected to the drive circuit.

Further, the load-bearing beam and the guide side beams are each provided with a soil scraping plate, an upper end face of the soil scraping plate is hinged to groove bottoms of the load-bearing beam and the guide side beams through the elastic hinge, and a lower end face of the soil scraping plate is abutted against outer surfaces of the main pressure roller and the auxiliary pressure rollers.

Further, the shaft sleeves corresponding to two ends of the spray rollers and a side wall of the guide groove are connected through a pressure sensor, and a guide roller symmetrically distributed with an axis of the guide groove and the spray roller is disposed inside the guide groove, the guide roller is connected to the side wall of the guide groove through an elastic telescopic column, and a spacing between the spray roller and the guide roller is 0-10 mm; and the drive circuit is a circuit system based on a programmable controller, and the drive circuit is further provided with a data communication module.

Further, the present invention also provides a use of the method for cultivating alcohol-brewing sorghum on the basis of a biodegradable mulching film.

Compared with a traditional alcohol-brewing sorghum planting method, the present invention has the following advantages:

1. By adopting simultaneous planting technology of mulching and herbicide application, the present invention can, on the one hand, effectively bring forward the planting time of alcohol-brewing sorghum and make the seeding amount reduced by 10%-30% compared with that of the traditional alcohol-brewing sorghum planting method, and assist in increasing the germination rate of alcohol-brewing sorghum, and on the other hand, the present invention can effectively reduce the labor intensity and cost of a weeding operation in field management, effectively reduce the root interference and nutrient loss caused by weeds to the growth and development of alcohol-brewing sorghum and promote the growth and development of alcohol-brewing sorghum.

2. By crushing and natural degradation of the biodegradable mulching film and the alcohol-brewing sorghum straw, the present invention can reduce the consumed amount of fertilizer, significantly increase the nitrate nitrogen content in the soil (14.2-17.8 mg/kg), promote the activity of microorganisms in soil, meet the physiological requirements for the growth of alcohol-brewing sorghum, and eliminate "white pollution" caused by a traditional film mulching operation and the damage to the soil structure caused by excessive use of chemical fertilizers.

3. By selecting the biodegradable mulching film (in black) and spraying the herbicide before film mulching, the weed control effect can be significantly improved in the early stage of development and growth of the alcohol-brewing sorghum (60-75 d).

4. The present invention can effectively improve the planting efficiency of the alcohol-brewing sorghum, improve the comprehensive utilization rate of water and fertilizer, and achieve the purpose of reducing the amount and costs of water and fertilizer usage and increasing the yield of the alcohol-brewing sorghum. Statistical analysis of the yield and costs over 3-5 consecutive years reveals that at harvest time, the average height of alcohol-brewing sorghum plants is about 20-60 cm higher than that of alcohol-brewing sorghum plants cultivated through the traditional alcohol-brewing sorghum planting method, the yield of alcohol-brewing sorghum per 666.67 square meters increased by 20%-30%, achieving an increase in economic benefits per 666.67 square meters by more than 15%.

BRIEF DESCRIPTION OF THE DRAWINGS

The present invention is described in detail below in conjunction with the accompanying drawings and specific embodiments.

DETAILED DESCRIPTIONS OF THE EMBODIMENTS

In order to make the technical means, inventive features, achieved objectives and effects of the present invention clear and understandable, the present invention is further described in combination with the specific implementations below.

Embodiment 1

Figure 1:
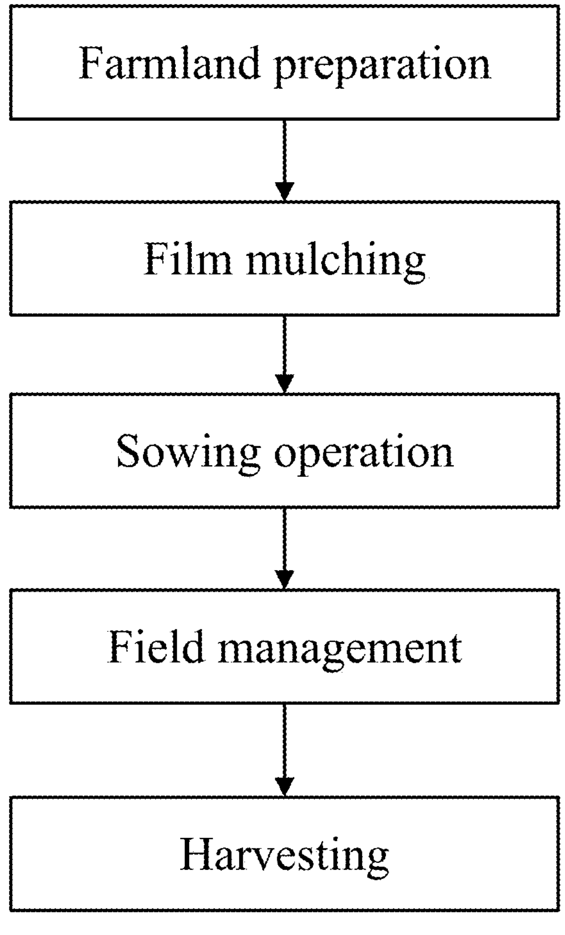
FIG. 1 is a schematic flowchart of a method according to the present invention.

As shown in FIG. 1, a method for cultivating alcohol-brewing sorghum on the basis of a biodegradable mulching film and a use thereof, including the following steps:

S1. farmland preparation: firstly, farmland is deeply plowed through a rotary cultivator, the farmland after deep plowing is dried for 5 d, the farmland is raked before sowing, base fertilizer and bactericide are then applied to the farmland as a whole in the raking process, ridging operation is finally performed in the farmland, ridge surfaces, ridge ditches and side surfaces in the farmland after raking and ridging are sprayed with herbicide, and the farmland after being sprayed with the herbicide is dried for 1 d;

it should be noted that in the drying process, an average temperature during drying is not lower than 26° C., without any cloudy and rainy weather, and when it is rainy in the drying process, the farmland is dried again after the rain ends; and a depth of the deep plowing is 30 cm;

S2. film mulching: the ridge surfaces and side surfaces after being prepared in the step S1 are covered with the biodegradable mulching film through a film mulching machine, the biodegradable mulching film is covered on the ridge surfaces and side surfaces, and surfaces of the biodegradable mulching film after mulching are flattened to achieve positioning of the biodegradable mulching film;

where the herbicide is S-metolachlor (96% EC) with 100-125 ml per 666.67 square meters, and then diluted with 40 kg of water for spraying;

S3. perform sowing operation: 5 d after the positioning operation of the biodegradable mulching film in the step S2, punching is performed on the ridge surfaces by using a punch planter for sowing alcohol-brewing sorghum, where the sowing operation is performed in mid-April, water holding capacity is 60% during sowing, a punching depth for sowing is 2.5 cm, 2 seeds are sown in each hole, and a total sowing amount is 0.5 kg per 666.67 square meters;

where the alcohol-brewing sorghum seeds for sowing are all coated with pesticide, and water content of the alcohol-brewing sorghum seeds during sowing is not greater than 20%;

S4. field management: after the sowing operation is completed, topdressing and routine field management are performed on the sowed alcohol-brewing sorghum, resowing and removal of the alcohol-brewing sorghum seedlings are performed when the alcohol-brewing sorghum seedlings reach 30 cm on average, and after the resowing and removal of the alcohol-brewing sorghum seedlings are completed, the number of seedlings reaches 10,000 seedlings per 666.67 square meters; at the same time, topdressing is performed according to a standard of 3 kg per 666.67 square meters within 3 d upon completion of the resowing and removal of the alcohol-brewing sorghum seedlings, another topdressing is performed according to a standard of 20 kg per 666.67 square meters at a jointing stage and a heading stage, respectively; and further, pest prevention, weeding operation, irrigation and waterlogging prevention management are synchronously performed according to the development and growth of alcohol-brewing sorghum; and S5. harvesting: harvesting operation of the alcohol-brewing sorghum is performed before late October, residual alcohol-brewing sorghum straw and residual biodegradable mulching film are synchronously crushed, and the crushed straw and biodegradable mulching film can be used for preparing the farmland in the step S1, and evenly distributed in the farmland through a deep plowing operation, and covered and stirred by the deep plowing soil, such that the farmland preparation is completed for subsequent sowing.

It is important to note that, in the step S1, the deep plowing operation is performed after the harvest of the alcohol-brewing sorghum is completed, and after the deep plowing and drying are completed:

when it is necessary to resow autumn and winter crops, subsequent crop planting needs to be performed after 5 d of drying, and the farmland needs to be subjected to a deep plowing operation again after the autumn and winter crops are harvested to prepare for the planting of alcohol-brewing sorghum in a second year; and when the harvest of the alcohol-brewing sorghum is completed and the farmland is left fallow, drying can be performed after the deep plowing operation is completed until the base fertilizer and the raking operation are performed before the alcohol-brewing sorghum is planted.

At the same time, the base fertilizer topdressed in the step S1 is any one of or both of biological compound fertilizer and compost, and soil bactericide and insecticide spraying operation are simultaneously performed during the topdressing of the base fertilizer; and where organic mass of decomposed manure is 1,000-2,500 kg per 666.67 square meters, and biological compound fertilizer is 10-15 kg of nitrogen fertilizer, 5-10 kg of phosphate fertilizer, 8-12 kg of potassium fertilizer, and 1-2.5 kg of trace elements per 666.67 square meters.

In this embodiment, in the step S2, a width of the biodegradable mulching film is 1.3 times a width of the ridge surface, and edges of the biodegradable mulching film are embedded under a top layer of the soil, with a depth of 10 mm.

At the same time, during the sowing operation, a diameter of the punching hole is 10 mm, a punching axis forms an included angle of 90° with the ridge surface, and a punching depth for sowing is 50% of a height of the ridge.

Embodiment 2

As shown in FIG. 1, a method for cultivating alcohol-brewing sorghum on the basis of a biodegradable mulching film and a use thereof, including the following steps:

S1. farmland preparation: firstly, farmland is deeply plowed through a rotary cultivator, the farmland after deep plowing is dried for 15 d, the farmland is raked, base fertilizer and bactericide are then applied to the farmland as a whole in the raking process, ridging operation is finally performed in the farmland, ridge surfaces, ridge ditches and side surfaces in the farmland after raking and ridging are sprayed with herbicide, and the farmland after being sprayed with the herbicide is dried for 3 d;

it should be noted that in the drying process, the highest temperature during drying is not lower than 30° C., without any cloudy and rainy weather, and when it is rainy in the drying process, the farmland is dried again after the rain ends; and a depth of the deep plowing is 30 cm.

S2. film mulching: the ridge surfaces and side surfaces after being prepared in the step S1 are covered with the biodegradable mulching film through a film mulching machine, the biodegradable mulching film is covered on the ridge surfaces and side surfaces, and surfaces of the biodegradable mulching film after mulching are flattened to achieve positioning of the biodegradable mulching film;

where the herbicide is 30%-60% atrazine water suspension, and a thickness of a herbicide layer sprayed on surfaces of the biodegradable mulching film is 0.1-1 mm; and S3. swing operation: 10 d after the positioning operation of the biodegradable mulching film in the step S2, punching is performed on the ridge surfaces by using a punch planter for sowing alcohol-brewing sorghum, where the sowing operation is performed in early May, water holding capacity is 70% during sowing, a punching depth for sowing is 3 cm, 5 seeds are sown in each hole, and a total sowing amount is 0.8 kg per 666.67 square meters;

where the alcohol-brewing sorghum seeds for sowing are all coated with pesticide, and water content of the alcohol-brewing sorghum seeds during sowing is not greater than 20%;

S4. field management: after the sowing operation is completed, topdressing and routine field management are performed on the sowed alcohol-brewing sorghum, resowing and removal of the alcohol-brewing sorghum seedlings are performed when the alcohol-brewing sorghum seedlings reach 30 cm on average, and after the resowing and removal of the alcohol-brewing sorghum seedlings are completed, the number of seedlings reaches 10,000 seedlings per 666.67 square meters; at the same time, topdressing is performed according to a standard of 3 kg per 666.67 square meters within 7 d upon completion of the resowing and removal of the alcohol-brewing sorghum seedlings, another topdressing is performed according to a standard of 10 kg per 666.67 square meters at a jointing stage and a heading stage, respectively; and further, pest prevention, weeding operation, irrigation and waterlogging prevention management are synchronously performed according to the development and growth of alcohol-brewing sorghum; and S5. harvesting: harvesting operation of the alcohol-brewing sorghum is performed before late October, residual alcohol-brewing sorghum straw and residual biodegradable mulching film are synchronously crushed, and the crushed straw and biodegradable mulching film can be used for preparing the farmland in the step S1, and evenly distributed in the farmland through a deep plowing operation, and covered and stirred by the deep plowing soil, such that the farmland preparation is completed for subsequent sowing.

In this embodiment, in the step S1, the deep plowing operation is performed after the harvest of the alcohol-brewing sorghum is completed, and when it is necessary to resow autumn and winter crops, subsequent crop planting needs to be performed after 5-15 d of drying, and the farmland needs to be subjected to a deep plowing operation again after the autumn and winter crops are harvested to prepare for the planting of alcohol-brewing sorghum in a second year; and further, the base fertilizer topdressed in the step S1 is any one of or both of biological compound fertilizer and compost, and soil bactericide and insecticide spraying operation are simultaneously performed during the topdressing of the base fertilizer.

In this embodiment, in the step S2, a width of the biodegradable mulching film is 2 times a width of the ridge surface, and edges of the biodegradable mulching film are embedded under a top layer of the soil, with a depth of 25 mm.

At the same time, during the sowing operation, a diameter of the punching hole is 30 mm, a punching axis forms an included angle of 45° with the ridge surface, and a punching depth for sowing is 10% of a height of the ridge.

Embodiment 3

As shown in FIG. 1, a method for cultivating alcohol-brewing sorghum on the basis of a biodegradable mulching film and a use thereof, including the following steps:

S1. farmland preparation: firstly, farmland is deeply plowed through a rotary cultivator, the farmland after deep plowing is dried for 10 d, the farmland is raked, base fertilizer and bactericide are then applied to the farmland as a whole in the raking process, ridging operation is finally performed in the farmland, ridge surfaces, ridge ditches and side surfaces in the farmland after raking and ridging are sprayed with herbicide, and the farmland after being sprayed with the herbicide is dried for 2 d;

it should be noted that in the drying process, an average temperature during drying is not lower than 28° C., without any cloudy and rainy weather, and when it is rainy in the drying process, the farmland is dried again after the rain ends; and a depth of the deep plowing is 25 cm;

S2. film mulching: the ridge surfaces and side surfaces after being prepared in the step S1 are covered with the biodegradable mulching film through a film mulching machine, the biodegradable mulching film is covered on the ridge surfaces and side surfaces, and surfaces of the biodegradable mulching film after mulching are flattened to achieve positioning of the biodegradable mulching film;

where the herbicide is 38% atrazine water suspension with 180-240 ml per 666.67 square meters, and then diluted with 40 kg of water for spraying;

S3. swing operation: 7 d after the positioning operation of the biodegradable mulching film in the step S2, punching is performed on the ridge surfaces by using a punch planter for sowing alcohol-brewing sorghum, where the sowing operation is performed in late May, water holding capacity is 65% during sowing, a punching depth for sowing is 5 cm, 3 seeds are sown in each hole, and a total sowing amount is 0.6 kg per 666.67 square meters;

S4. field management: after the sowing operation is completed, topdressing and routine field management are performed on the sowed alcohol-brewing sorghum, resowing and removal of the alcohol-brewing sorghum seedlings are performed when the alcohol-brewing sorghum seedlings reach 20 cm on average, and after the resowing and removal of the alcohol-brewing sorghum seedlings are completed, the number of seedlings reaches 12,000 seedlings per 666.67 square meters; at the same time, topdressing is performed according to a standard of 3-5 kg per 666.67 square meters within 5 d upon completion of the resowing and removal of the alcohol-brewing sorghum seedlings, another topdressing is performed according to a standard of 18 kg per 666.67 square meters at a jointing stage and a heading stage, respectively; and further, pest prevention, weeding operation, irrigation and waterlogging prevention management are synchronously performed according to the development and growth of alcohol-brewing sorghum; and S5. harvesting: harvesting operation of the alcohol-brewing sorghum is performed before late October, residual alcohol-brewing sorghum straw and residual biodegradable mulching film are synchronously crushed, and the crushed straw and biodegradable mulching film can be used for preparing the farmland in the step S1, and evenly distributed in the farmland through a deep plowing operation, and covered and stirred by the deep plowing soil, such that the farmland preparation is completed for subsequent sowing.

In this embodiment, in the step S1, the deep plowing operation is performed after the harvest of the alcohol-brewing sorghum is completed, and when the harvest of the alcohol-brewing sorghum is completed and the farmland is left fallow, drying can be performed after the deep plowing operation is completed until the base fertilizer and the raking operation are performed before the alcohol-brewing sorghum is planted.

It should be noted that, the base fertilizer topdressed in the step S1 is any one of or both of biological compound fertilizer and compost, and soil bactericide and insecticide spraying operation are simultaneously performed during the topdressing of the base fertilizer.

Organic mass of decomposed manure is 1,000-2,500 kg per 666.67 square meters, and biological compound fertilizer is 10-15 kg of nitrogen fertilizer, 5-10 kg of phosphate fertilizer, 8-12 kg of potassium fertilizer, and 1-2.5 kg of trace elements per 666.67 square meters.

In addition, in the step S2, a width of the biodegradable mulching film is 1.5 times a width of the ridge surface, and edges of the biodegradable mulching film are embedded under a top layer of the soil, with a depth of 25 mm.

In this embodiment, during the sowing operation, a diameter of the punching hole is 25 mm, a punching axis forms an included angle of 60° with the ridge surface, and a punching depth for sowing is 30% of a height of the ridge.

Embodiment 4

A method for cultivating alcohol-brewing sorghum on the basis of a biodegradable mulching film and a use thereof, including the following steps:

S1. farmland preparation: firstly, farmland is deeply plowed through a rotary cultivator, the farmland after deep plowing is dried for 7 d, the farmland is raked, base fertilizer and bactericide are then applied to the farmland as a whole in the raking process, ridging operation is finally performed in the farmland, ridge surfaces, ridge ditches and side surfaces in the farmland after raking and ridging are sprayed with herbicide, and the farmland after being sprayed with the herbicide is dried for 2 d;

S2. film mulching: the ridge surfaces and side surfaces after being prepared in the step S1 are covered with the biodegradable mulching film through a film mulching machine, the biodegradable mulching film is covered on the ridge surfaces and side surfaces, and surfaces of the biodegradable mulching film after mulching are flattened to achieve positioning of the biodegradable mulching film;

S3. swing operation: 15 d after the positioning operation of the biodegradable mulching film in the step S2, punching is performed on the ridge surfaces by using a punch planter for sowing alcohol-brewing sorghum, where the sowing operation is performed in early May, water holding capacity is 70% during sowing, a punching depth for sowing is 4.5 cm, 4 seeds are sown in each hole, and a total sowing amount is 0.7 kg per 666.67 square meters;

S4. field management: after the sowing operation is completed, topdressing and routine field management are performed on the sowed alcohol-brewing sorghum, resowing and removal of the alcohol-brewing sorghum seedlings are performed when the alcohol-brewing sorghum seedlings reach 25 cm on average, and after the resowing and removal of the alcohol-brewing sorghum seedlings are completed, the number of seedlings reaches 14,000 seedlings per 666.67 square meters; at the same time, topdressing is performed according to a standard of 3-5 kg per 666.67 square meters within 4 d upon completion of the resowing and removal of the alcohol-brewing sorghum seedlings, another topdressing is performed according to a standard of 18 kg per 666.67 square meters at a jointing stage and a heading stage, respectively; and further, pest prevention, weeding operation, irrigation and waterlogging prevention management are synchronously performed according to the development and growth of alcohol-brewing sorghum; and S5. harvesting: harvesting operation of the alcohol-brewing sorghum is performed before late October, residual alcohol-brewing sorghum straw and residual biodegradable mulching film are synchronously crushed, and the crushed straw and biodegradable mulching film can be used for preparing the farmland in the step S1, and evenly distributed in the farmland through a deep plowing operation, and covered and stirred by the deep plowing soil, such that the farmland preparation is completed for subsequent sowing.

It is important to note that, in the step S1, the deep plowing operation is performed after the harvest of the alcohol-brewing sorghum is completed, and after the deep plowing and drying are completed:

when it is necessary to resow autumn and winter crops, subsequent crop planting needs to be performed after 5-15 d of drying, and the farmland needs to be subjected to a deep plowing operation again after the autumn and winter crops are harvested to prepare for the planting of alcohol-brewing sorghum in a second year; and when the harvest of the alcohol-brewing sorghum is completed and the farmland is left fallow, drying can be performed after the deep plowing operation is completed until the base fertilizer and the raking operation are performed before the alcohol-brewing sorghum is planted.

In this embodiment, the base fertilizer topdressed in the step S1 is any one of or both of biological compound fertilizer and compost, and soil bactericide and insecticide spraying operation are simultaneously performed during the topdressing of the base fertilizer.

At the same time, in the step S2, a width of the biodegradable mulching film is 1.8 times a width of the ridge surface, and edges of the biodegradable mulching film are embedded under a top layer of the soil, with a depth of 12 mm.

In addition, during the sowing operation, a diameter of the punching hole is 20 mm, a punching axis forms an included angle of 90° with the ridge surface, and a punching depth for sowing is 10% of a height of the ridge.

The method for cultivating alcohol-brewing sorghum on the basis of a biodegradable mulching film by the present invention can meet various needs of farmland use in the alcohol-brewing sorghum areas, and the method can adopt by using the biodegradable mulching film in combination with the herbicide to achieve the following effects:

1. the stability of a germination breeding environment of the alcohol-brewing sorghum is effectively improved, and a germination rate of the alcohol-brewing sorghum is increased;
2. the comprehensive utilization rate of water and fertilizer and the water retention capacity of the farmland are effectively improved, and the soil structure and the soil fertility are improved, such that planting costs of the alcohol-brewing sorghum is reduced, and the yield of the alcohol-brewing sorghum and plant resistance to pests are increased;
3. the amount of weeds in the field during the planting of alcohol-brewing sorghum is effectively inhibited, the interference and influence of weeds on the development of alcohol-brewing sorghum plant can be effectively prevented, and the loss of water and nutrients in the farmland caused by the weeds is effective reduced, such that the yield and economic benefits of alcohol-brewing sorghum are further improved, and the labor intensity and cost of field management of the alcohol-brewing sorghum farmland are effectively reduced;
4. crushing and natural degradation of the biodegradable mulching film and the alcohol-brewing sorghum straw can effectively eliminate environmental pollution caused by plastic and straw incineration of the traditional mulching film, and further, content of organic matters in the farmland can be effectively improved, the soil structure and fertility are improved, and the soil compaction caused by the long-term use of chemical fertilizers, and the like, are eliminated; and
5. by selecting the biodegradable mulching film and spraying the herbicide before film mulching, the weed control effect can be significantly improved in the early stage of development and growth of the alcohol-brewing sorghum (60-75 d).

Figure 2:
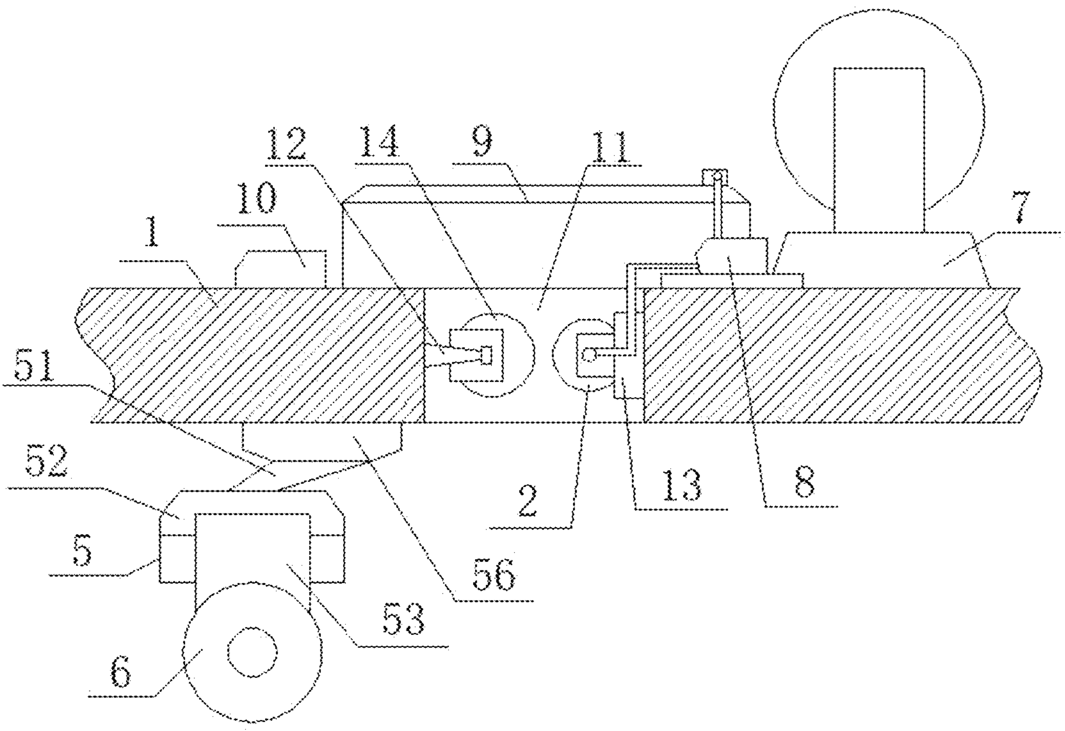
FIG. 2 is a schematic structural diagram of a film mulching machine according to the present invention.
Figure 3:
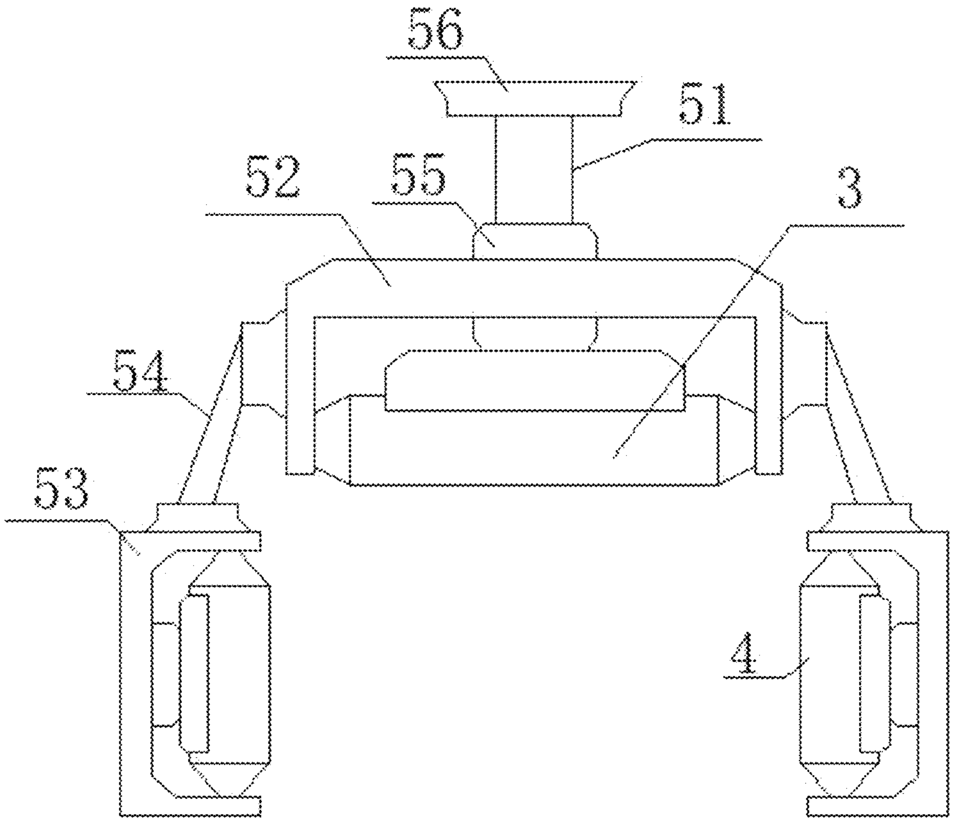
FIG. 3 is a schematic structural diagram of an adjustable roller frame according to the present invention.

As shown in FIGS. 2 and 3, it should be noted that that in the step S2, the film mulching machine includes a carrier body 1, spray rollers 2, a main pressure roller 3, auxiliary pressure rollers 4, an adjustable roller frame 5, soil covering wheels 6, a film unwinding frame 7, a spray pump 8, an agricultural chemicals tank 9 and a drive circuit 10, where the film unwinding frame 7 is connected to an upper end surface of the carrier body 1, the adjustable roller frame 5 is connected to a lower end surface of the carrier body 1, and further, axes of the adjustable roller frame 5 and the film unwinding frame 7 are parallel to each other and are perpendicular to an axis of the carrier body 1; a guide groove 11 is formed on the corresponding carrier body 1 between the adjustable roller frame 5 and the film unwinding frame 7, at least one spray roller 2 is embedded inside the guide groove 11 and is perpendicular to an axis of the carrier body 1, two ends of the spray roller 2 are connected to a side wall of the guide groove 11 through shaft sleeves and are communicated with the spray pump 8 through guide pipes, and the spray pump 8 is further communicated with the agricultural chemicals tank 9, the main pressure roller 3 and the auxiliary pressure rollers 4 are both connected to the adjustable roller frame 5, an axis of the main pressure roller 3 is parallel to the lower end of the carrier body 1 and is perpendicular to the axis of the carrier body 1, two auxiliary pressure rollers 4 are provided, the two auxiliary pressure rollers 4 are symmetrically distributed on two sides of the main pressure roller 3, the axis of the main pressure roller 3 and the auxiliary rollers 4 form an included angle of 0°-90°, six soil covering wheels 6 are provided and are symmetrically distributed on two sides of the adjustable roller frame 5, and are located on outer sides of the auxiliary rollers 4, axes of the soil covering wheels 6 are parallel to the axis of the main pressure roller 3, lower end surfaces of the soil covering wheels 6 exceed lower end surfaces of the auxiliary rollers 4 by at least 5 mm, the drive circuit 10 is connected to the upper end surface of the carrier body 1 and is electrically connected to the adjustable roller frame 5, the film unwinding frame 7, and the spray pump 8, respectively.

It should be noted that the adjustable roller frame 5 includes a lifting drive mechanism 51, a load-bearing beam 52, guide side beams 53, telescopic adjustment columns 54, an elastic hinge 55 and a turntable mechanism 56, where the load-bearing beam 52 and the guide side beams 53 are each a groove frame structure with an axial cross section being as a upside-down box, the load-bearing beam 52 and the guide side beams 53 are groove frame structures with each being provided with an axial cross section as an upside-down box, the main pressure roller 3 is embedded inside the load-bearing beam 52 and is parallel to an axis of the load-bearing beam 52, the auxiliary pressure rollers 4 are embedded inside the guide side beam 53 and are parallel to axes of the guide side beams 53, diameters of the main pressure roller 3 and the auxiliary pressure rollers 4 are at least twice widths of the load-bearing beam 52 and the guide side beams 53, an upper end surface of the load-bearing beam 52 is hinged to the lifting drive mechanism 51 through the elastic hinge 55, an intersection of the load-bearing beam 52 and the lifting drive mechanism 51 is located at a midpoint of the load-bearing beam 52, an upper end surface of the lifting drive mechanism 51 is hinged to the lower end surface of the carrier body 1 through the turntable mechanism 56, an axis of the lifting drive mechanism 51 and the lower end surface of carrier body 1 form an included angle of 0°-90°, a left side and a right side of the load-bearing beam 52 are respectively connected to an upper end surface of one of the guide side beams 53 through the telescopic adjustment columns 54, two ends of the telescopic adjustment columns 54 are hinged to the load-bearing beam 52 and the guide side beams 53 respectively through the turntable mechanism 56, axes of the load-bearing beam 52 and the guide side beams 53 form included angles of 0°-90°, an outer side surface corresponding to a lower end surface of the lifting drive mechanism 51 is connected to one soil covering wheel 6, and the lifting drive mechanism 51 and the turntable mechanism 56 are both electrically connected to the drive circuit 10.

In this embodiment, the load-bearing beam 52 and the guide side beams 53 are each provided with a soil scraping plate 57, an upper end face of the soil scraping plate 57 is hinged to groove bottoms of the load-bearing beam 52 and the guide side beams 53 through the elastic hinge 55, and a lower end face of the soil scraping plate is abutted against outer surfaces of the main pressure roller 3 and the auxiliary pressure rollers 4.

Further, the shaft sleeves corresponding to two ends of the spray rollers 2 and a side wall of the guide groove 11 are connected through a pressure sensor 13, and a guide roller 14 symmetrically distributed with an axis of the guide groove 11 and the spray roller 2 is disposed inside the guide groove 11, the guide roller 14 is connected to the side wall of the guide groove 11 through an elastic telescopic column 12, and a spacing between the spray roller 2 and the guide roller 14 is 0-10 mm.

In addition, the drive circuit 10 is a circuit system based on a programmable controller, and the drive circuit 10 is further provided with a data communication module.

The lifting drive mechanism 51, the telescopic adjustment columns 54 and the elastic telescopic column 12 are any one of an electric telescopic rod, a hydraulic telescopic rod, a pneumatic telescopic rod, and a gear rack mechanism.

Further preferably, axial cross sections of the main pressure roller 3 and the auxiliary pressure rollers 4 are any one of a rectangular shape, an elliptical shape, and a fusiform structure; and the used carrier body is any one of a wheeled tractor and a crawler tractor, and the tractor is further provided with a satellite positioning device.

When the biodegradable mulching film is laid, the biodegradable mulching film is first installed on the film unwinding frame, the herbicide solution is poured into the agricultural chemicals tank, the biodegradable mulching film is then pulled and guided through the guide groove, and is carried and positioned by the spray roller and the guide roller inside the guide groove, the biodegradable mulching film is then conveyed to a position of the adjustable roller frame, guided and pressed on the ridge surface and the side wall of the ridge ditch through the main pressure roller and the auxiliary pressure rollers, and at the same time, side edges of the biodegradable mulching film are embedded under the top layer of the soil through the soil covering wheels, and covered and pressed by the soil for positioning; finally, the carrier body, the adjustable roller frame, and the spray pump and the film unwinding frame are driven to operate, such that the film unwinding frame and the carrier body operate synchronously to perform the laying operation of the biodegradable mulching film; and in the process of laying the biodegradable mulching film, the spray roller sprays the herbicide on a contact surface between the biodegradable mulching film and the soil, and the ridge surface and an outer side surface of the ridge ditch are covered with the biodegradable mulching film after the spraying of the herbicide is completed, and the adjustable roller frame can be adjusted, such that, on the one hand, the pressure between the main pressure roller, the auxiliary pressure rollers and the soil covering wheels on the soil during the laying of the biodegradable mulching film can be adjusted to improve the stability of the covering and laying positioning of the biodegradable mulching film, and on the other hand, distances and included angles between the main pressure roller and the auxiliary pressure rollers are adjusted to meet the requirements of laying operation of ridge surface structures in different farmlands.

What is shown and described above is about basic principles, essential features and advantages of the present invention. It should be understood by those skilled in the art that, the present invention is not limited by the embodiments described above. The embodiments described above and the descriptions in the description merely illustrate the principles of the present invention. Various changes and modifications may be made to the present invention without departing from the spirit and scope of the present invention. These changes and modifications all fall within the claimed scope of the present invention. The claimed scope of the present invention is defined by the appended claims and their equivalents.

What is claimed is:

1. A method for cultivating alcohol-brewing sorghum on the basis of a biodegradable mulching film, comprising the following steps:

S1. farmland preparation: firstly, farmland is deeply plowed through a rotary tiller plate, the farmland after deep plowing is dried for 5-15 d and is raked, base fertilizer and bactericide are then applied to the farmland as a whole in the raking process, ridging operation is finally performed in the farmland, ridge surfaces, ridge ditches and side surfaces in the farmland after raking and ridging are sprayed with herbicide, and the farmland after being sprayed with the herbicide is dried for 1-3 d; wherein the herbicide is S-metolachlor (96% EC) with 100-125 ml per 666.67 square meters, and then diluted with 40 kg of water for spraying; or the herbicide is 38% atrazine water suspension with 180-240 ml per 666.67 square meters, and then diluted with 40 kg of water for spraying;

S2. film mulching: the ridge surfaces and side surfaces after being prepared in the step S1 are covered with the black biodegradable mulching film through a film mulching machine, the biodegradable mulching film is covered on the ridge surfaces and side surfaces, and surfaces of the biodegradable mulching film after mulching are flattened to achieve positioning of the biodegradable mulching film;

S3. sowing operation: 5 d after the positioning operation of the biodegradable mulching film in the step S2, punching is performed on the ridge surfaces by using a punch planter for sowing alcohol-brewing sorghum, wherein the sowing operation is performed from mid-April to late June, water holding capacity is 60-70% during sowing, a punching depth for sowing is 2.5-5 cm, 2-5 seeds are sown in each hole, and a total sowing amount is 0.5-0.8 kg per 666.67 square meters;

S4. field management: after the sowing operation is completed, topdressing and routine field management are performed on the sowed alcohol-brewing sorghum, resowing and removal of the alcohol-brewing sorghum seedlings are performed when the alcohol-brewing sorghum seedlings reach 15-30 cm on average, and after the resowing and removal of the alcohol-brewing sorghum seedlings are completed, the number of seedlings reaches 10,000-15,000 seedlings per 666.67 square meters; at the same time, topdressing is performed according to a standard of 3-5 kg per 666.67 square meters within 3-7 d upon completion of the resowing and removal of the alcohol-brewing sorghum seedlings, another topdressing is performed according to a standard of 10-20 kg per 666.67 square meters at a jointing stage and a heading stage, respectively; further, pest prevention, weeding operation, irrigation and waterlogging prevention management are synchronously performed according to the development and growth of alcohol-brewing sorghum; and in the early stage of development and growth of the alcohol-brewing sorghum, that is, 60-75 d, the biodegradable mulching film plays a role in warming, retaining moisture and removing weeds, facilitating topdressing and other field operations; and S5. harvesting: harvesting operation of the alcohol-brewing sorghum is performed before late October, residual alcohol-brewing sorghum straw and residual biodegradable mulching film are synchronously crushed, and the crushed straw and the biodegradable mulching film can be used for preparing the farmland in the step S1, and evenly distributed in the farmland through a deep plowing operation, and covered and stirred by the deep plowing soil, such that the farmland preparation is completed for subsequent sowing; wherein in the step S2, the film mulching machine comprises a carrier body, spray rollers, a main pressure roller, auxiliary pressure rollers, an adjustable roller frame, soil covering wheels, a film unwinding frame, a spray pump, an agricultural chemicals tank and a drive circuit, wherein the film unwinding frame is connected to an upper end surface of the carrier body, the adjustable roller frame is connected to a lower end surface of the carrier body, and further, axes of the adjustable roller frame and the film unwinding frame are parallel to each other and are perpendicular to an axis of the carrier body; a guide groove is formed on the corresponding carrier body between the adjustable roller frame and the film unwinding frame, at least one spray roller is embedded inside the guide groove and is perpendicular to the axis of the carrier body, two ends of the spray roller are connected to a side wall of the guide groove through shaft sleeves and are communicated with the spray pump through guide pipes, and the spray pump is further communicated with the agricultural chemicals tank, the main pressure roller and the auxiliary pressure rollers are both connected to the adjustable roller frame, an axis of the main pressure roller is parallel to the lower end of the carrier body and is perpendicular to the axis of the carrier body, two auxiliary pressure rollers are provided, the two auxiliary pressure rollers are symmetrically distributed on two sides of the main pressure roller, the axis of the main pressure roller and the auxiliary rollers form an included angle of 0°-90°, six soil covering wheels are provided and are symmetrically distributed on two sides of the adjustable roller frame, and are located on outer sides of the auxiliary rollers, axes of the soil covering wheels are parallel to the axis of the main pressure roller, lower end surfaces of the soil covering wheels exceed lower end surfaces of the auxiliary rollers by at least 5 mm, and the drive circuit is connected to the upper end surface of the carrier body and is electrically connected to the adjustable roller frame, the film unwinding frame, and the spray pump, respectively;

the adjustable roller frame comprises a lifting drive mechanism, a load-bearing beam, guide side beams, telescopic adjustment columns, an elastic hinge and a turntable mechanism, the load-bearing beam and the guide side beams are groove frame structures with each being provided with an axial cross section as an upside-down box, the main pressure roller is embedded inside the load-bearing beam and is parallel to an axis of the load-bearing beam, the auxiliary pressure rollers are embedded inside the guide side beams and are parallel to axes of the guide side beams, diameters of the main pressure roller and the auxiliary pressure rollers are at least twice widths of the load-bearing beam and the guide side beams, an upper end surface of the load-bearing beam is hinged to the lifting drive mechanism through the elastic hinge, an intersection of the load-bearing beam and the lifting drive mechanism is located at a midpoint of the load-bearing beam, an upper end surface of the lifting drive mechanism is hinged to the lower end surface of the carrier body through the turntable mechanism, an axis of the lifting drive mechanism and the lower end surface of carrier body form an included angle of 0°-90°, a left side and a right side of the load-bearing beam are respectively connected to an upper end surface of one of the guide side beams through the telescopic adjustment columns, two ends of the telescopic adjustment columns are hinged to the load-bearing beam and the guide side beams respectively through the turntable mechanism, axes of the load-bearing beam and the guide side beams form included angles of 0°-90°, an outer side surface corresponding to a lower end surface of the lifting drive mechanism is connected to one soil covering wheel, and the lifting drive mechanism and the turntable mechanism are both electrically connected to the drive circuit; and the shaft sleeves corresponding to two ends of the spray rollers and a side wall of the guide groove are connected through a pressure sensor, and a guide roller symmetrically distributed with an axis of the guide groove and the spray roller is disposed inside the guide groove, the guide roller is connected to the side wall of the guide groove through an elastic telescopic column, and a spacing between the spray roller and the guide roller is 0-10 mm; and the drive circuit is a circuit system based on a programmable controller, and the drive circuit is further provided with a data communication module.

2. The method for cultivating alcohol-brewing sorghum on the basis of a biodegradable mulching film according to claim 1, wherein in the step S1, the deep plowing operation is performed after the harvest of the alcohol-brewing sorghum is completed, and after the deep plowing and drying are completed:

when it is necessary to resow autumn and winter crops, subsequent crop planting needs to be performed after 5-15 d of drying, and the farmland needs to be subjected to a deep plowing operation again after the autumn and winter crops are harvested to prepare for the planting of alcohol-brewing sorghum in a second year; and when the harvest of the alcohol-brewing sorghum is completed and the farmland is left fallow, drying can be performed after the deep plowing operation is completed until the base fertilizer and the raking operation are performed before the alcohol-brewing sorghum is planted.

3. The method for cultivating alcohol-brewing sorghum on the basis of a biodegradable mulching film according to claim 1, wherein the base fertilizer topdressed in the step S1 is any one of or both of biological compound fertilizer and compost, and soil bactericide and insecticide spraying operation are simultaneously performed during the topdressing of the base fertilizer.

4. The method for cultivating alcohol-brewing sorghum on the basis of a biodegradable mulching film according to claim 1, wherein in the step S2, a width of the biodegradable mulching film is 1.3-2 times a width of the ridge surface, and side edges of the biodegradable mulching film are embedded under a top layer of the soil, with a depth of not less than 10 mm.

5. The method for cultivating alcohol-brewing sorghum on the basis of a biodegradable mulching film according to claim 1, wherein during the sowing operation, a diameter of the punching hole is 10-30 mm, a punching axis forms an included angle of 45°-90° with the ridge surface, and a punching depth for sowing is 10%-20% of a height of the ridge.

6. The method for cultivating alcohol-brewing sorghum on the basis of a biodegradable mulching film according to claim 1, wherein the load-bearing beam and the guide side beams are each provided with a soil scraping plate, an upper end face of the soil scraping plate is hinged to groove bottoms of the load-bearing beam and the guide side beams through the elastic hinge, and a lower end face of the soil scraping plate is abutted against outer surfaces of the main pressure roller and the auxiliary pressure rollers.

7. A use of a biodegradable mulching film in cultivating alcohol-brewing sorghum, wherein the use adopts the method for cultivating alcohol-brewing sorghum on the basis of a biodegradable mulching film according to claim 1.

* * * * *